(12) United States Patent
Kim et al.

(10) Patent No.: US 9,825,334 B2
(45) Date of Patent: Nov. 21, 2017

(54) RECHARGEABLE LITHIUM BATTERY (71) Applicant: SAMSUNG SDI CO., LTD., Yongin-si, Gyeonggi-do (KR)

(72) Inventors: Yun-Hee Kim, Yongin-si (KR); Ho-Seok Yang, Yongin-si (KR); Jin-Hyeok Lim, Yongin-si (KR); Hee-Yeon Hwang, Yongin-si (KR); Hyun-Woo Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 176 days.

(21) Appl. No.: 14/661,801

(22) Filed: Mar. 18, 2015

(65) Prior Publication Data
US 2015/0325880 A1 Nov. 12, 2015

(30) Foreign Application Priority Data

May 9, 2014 (KR) .................. 10-2014-0055657

(51) Int. Cl.
*H01M 10/0567* (2010.01)
*H01M 10/0569* (2010.01)
*H01M 4/38* (2006.01)
*H01M 10/052* (2010.01)
H01M 4/36 (2006.01)
H01M 4/48 (2010.01)
H01M 4/587 (2010.01)

(52) U.S. Cl.
CPC ....... *H01M 10/0567* (2013.01); *H01M 4/386* (2013.01); *H01M 10/052* (2013.01); *H01M 10/0569* (2013.01); H01M 4/364 (2013.01); H01M 4/483 (2013.01); H01M 4/587 (2013.01)

(58) Field of Classification Search
CPC ......... H01M 10/0567; H01M 10/0569; H01M 10/052; H01M 4/386; H01M 4/364; H01M 4/483; H01M 4/587; Y02E 60/122
See application file for complete search history.

(56) References Cited

U.S. PATENT DOCUMENTS

2002/0025477 A1* 2/2002 Itagaki ............. H01M 10/0567
429/328

FOREIGN PATENT DOCUMENTS

| JP | 2003-257479 A | 9/2003 |
| KR | 10-2002-0020645 A | 3/2002 |
| KR | 10-2004-0061562 A | 7/2004 |
| KR | 10-2008-0087341 A | 10/2008 |
| KR | 10-2011-0083930 A | 7/2011 |

* cited by examiner

*Primary Examiner* — Laura Weiner
(74) *Attorney, Agent, or Firm* — Lee & Morse, P.C.

(57) ABSTRACT

Disclosed is a rechargeable lithium battery including a positive electrode; a negative electrode including a negative active material, the negative active material including a silicon-based material; and an electrolyte solution including a lithium salt, a non-aqueous organic solvent, and an additive. The additive includes an ethylene carbonate-based compound represented by Chemical Formula 1 and a pyridine-based compound represented by Chemical Formula 2:

[Chemical Formula 1]

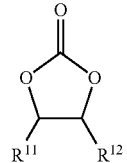

[Chemical Formula 2]

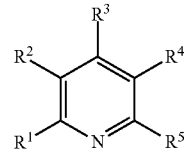

$R^{11}$, $R^{12}$ and $R^1$ to $R^5$ are each independently hydrogen, a halogen, a substituted or unsubstituted C1 to C20 alkyl group, or a C1 to C20 haloalkyl group; at least one of $R^{11}$ and $R^{12}$ is a halogen; and at least one of $R^1$ to $R^5$ is a halogen.

10 Claims, 8 Drawing Sheets

RECHARGEABLE LITHIUM BATTERY

CROSS-REFERENCE TO RELATED APPLICATION

Korean Patent Application No. 10-2014-0055657, filed on May 9, 2014, in the Korean Intellectual Property Office, and entitled: "Rechargeable Lithium Battery," is incorporated by reference herein in its entirety.

BACKGROUND

1. Field

A rechargeable lithium battery is disclosed.

2. Description of the Related Art

A rechargeable lithium battery may include positive and negative electrodes that may include a material that can reversibly intercalate/deintercalate lithium ions as positive and negative active materials and an organic electrolyte solution or a polymer electrolyte solution charged between the positive and negative electrodes. The positive and negative electrodes may intercalate and deintercalate lithium ions and produce electrical energy through oxidation and reduction reactions.

SUMMARY

Embodiments may be realized by providing a rechargeable lithium battery, including a positive electrode; a negative electrode including a negative active material, the negative active material including a silicon-based material; and an electrolyte solution including a lithium salt, a non-aqueous organic solvent, and an additive, the additive including an ethylene carbonate-based compound represented by Chemical Formula 1 and a pyridine-based compound represented by Chemical Formula 2:

[Chemical Formula 1]

[Chemical Formula 2]

wherein:

$R^{11}$, $R^{12}$, and $R^1$ to $R^5$ are each independently hydrogen, a halogen, a substituted or unsubstituted C1 to C20 alkyl group, or a C1 to C20 haloalkyl group, at least one of $R^{11}$ and $R^{12}$ is a halogen, and at least one of $R^1$ to $R^5$ is a halogen.

At least one of $R^1$ to $R^5$ may be a C1 to C20 alkyl group.

The pyridine-based compound represented by Chemical Formula 2 may be included in an amount of about 0.1 parts by weight to about 3 parts by weight based on 100 parts by weight of the non-aqueous organic solvent.

The pyridine-based compound represented by Chemical Formula 2 may be included in an amount of about 0.1 parts by weight to about 1 part by weight based on 100 parts by weight of the non-aqueous organic solvent.

The ethylene carbonate-based compound represented by Chemical Formula 1 may be included in an amount of about 0.1 parts by weight to about 20 parts by weight based on 100 parts by weight of the non-aqueous organic solvent.

The ethylene carbonate-based compound represented by Chemical Formula 1 may be included in an amount of about 7 parts by weight to about 12 parts by weight based on 100 parts by weight of the non-aqueous organic solvent.

The ethylene carbonate-based compound represented by Chemical Formula 1 and the pyridine-based compound represented by Chemical Formula 2 may be included in a weight ratio of about 5:1 to about 20:1.

The silicon-based material may include Si, $SiO_x$, a Si—C composite, a Si-Q alloy, or a combination thereof, wherein: $0<x<2$, and Q is an alkali metal, an alkaline-earth metal, a Group 13 to 16 element, a transition metal, a rare earth element, or a combination thereof, provided that Q is not Si.

The non-aqueous organic solvent may include ethylene carbonate.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

As used herein, when a definition is not otherwise provided, the term "substituted" may refer to substitution with a C1 to C30 alkyl group; a C2 to C30 alkenyl group, a C2 to C30 alkynyl group, a C1 to C10 alkylsilyl group; a C3 to C30 cycloalkyl group; a C6 to C30 aryl group; a C1 to C30 heteroaryl group; a C1 to C10 alkoxy group; a silane group; an alkylsilane group; an alkoxysilane group; an amine group; an alkylamine group; an arylamine group; or a halogen, instead of at least one hydrogen of a compound.

As used herein, when a definition is not otherwise provided, the term "alkyl group" may refer to "a saturated alkyl group" without any alkenyl group or alkynyl group; or "an unsaturated alkyl group" including at least one alkenyl group or alkynyl group. The "alkenyl group" may refer to a substituent having at least one carbon-carbon double bond of at least two carbons, and the "alkyne group" may refer to a substituent having at least one carbon-carbon triple bond of at least two carbons. The alkyl group may be a branched, linear, or cyclic alkyl group.

As used herein, the term "combination thereof" in a substituent (or a functional group) refers to two or more substituents linked by a linking group, two or more substituents condensed with each other.

In one embodiment, provided is a rechargeable lithium battery including a positive electrode; a negative electrode including a negative active material; and an electrolyte including a lithium salt, a non-aqueous organic solvent, and an additive, wherein the negative active material includes a silicon-based material, and the additive includes an ethylene carbonate-based compound represented by the following Chemical Formula 1 and a pyridine-based compound represented by the following Chemical Formula 2.

[Chemical Formula 1]

[Chemical Formula 2]

In the above Chemical Formulae 1 and 2, $R^{11}$, $R^{12}$ and $R^1$ to $R^5$ may each independently be hydrogen, a halogen, a substituted or unsubstituted C1 to C20 alkyl group, or a C1 to C20 haloalkyl group, at least one of $R^{11}$ and $R^{12}$ is a halogen, and at least one of $R^1$ to $R^5$ is a halogen.

The rechargeable lithium battery may have high-capacity, small thickness variations, and improved cycle-life characteristics.

The rechargeable lithium battery may be classified as a lithium ion battery, a lithium ion polymer battery, or a lithium polymer battery, depending on the kinds of separator and electrolyte used. It also may be classified as, for example, cylindrical, prismatic, coin-type, or pouch-type, depending on its shape. In addition, it may be classified as bulk type or thin film type depending on its size. Structures and manufacturing methods for lithium ion batteries pertaining to this disclosure may be determined by one of skill in the art.

Figure 1:
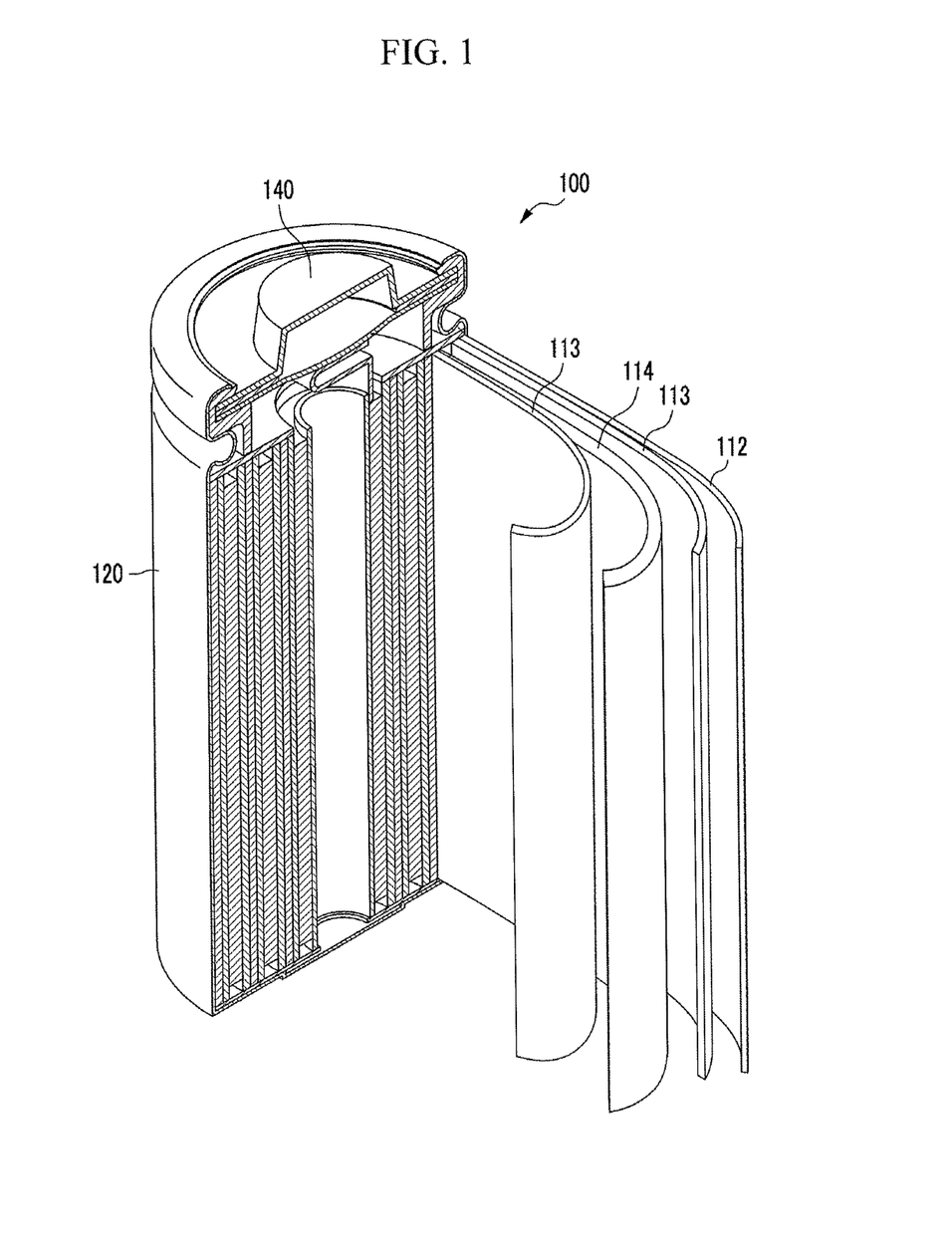
FIG. 1 illustrates a schematic view showing a rechargeable lithium battery according to one embodiment.

FIG. 1 illustrates an exploded perspective view showing a rechargeable lithium battery according to one embodiment. Referring to FIG. 1, the rechargeable lithium battery 100 may include a negative electrode 112, a positive electrode 114, a separator 113 interposed between the negative electrode 112 and the positive electrode 114, an electrolyte (not shown) impregnating the negative electrode 112, positive electrode 114, and separator 113, a battery case 120, and a sealing member 140 sealing the battery case 120. The rechargeable lithium battery 100 may be fabricated by sequentially laminating a negative electrode 112, a separator 113, and a positive electrode 114, spirally winding them, and housing the spiral-wound product in a battery case 120.

Hereinafter, each component of a rechargeable lithium battery according to one embodiment is described in detail.

Electrolyte

The electrolyte may include a non-aqueous organic solvent, a lithium salt, and additive.

The non-aqueous organic solvent may be selected from a carbonate-based, ester-based, ether-based, ketone-based, alcohol-based, or aprotic solvent.

Examples of carbonate based solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC), and examples of ester based solvents include methyl acetate, ethyl acetate, n-propyl acetate, 1,1-dimethylethyl acetate, methylpropionate, ethylpropionate, γ-butyrolactone, decanolide, valerolactone, mevalonolactone, and caprolactone.

Examples of ether-based solvents include dibutyl ether, tetraglyme, diglyme, dimethoxyethane, 2-methyltetrahydrofuran, and tetrahydrofuran, and an example of a ketone-based solvent is cyclohexanone.

In addition, examples of alcohol-based solvents include ethanol, isopropyl, and alcohol. Examples of aprotic solvents include nitriles such as R—CN (wherein R is a C2 to C20 linear, branched, or cyclic hydrocarbon group, and may include a double bond, an aromatic ring, or an ether bond), amides such as dimethylformamide, and dioxolanes such as 1,3-dioxolane, sulfolanes.

The non-aqueous organic solvent may be used singularly or in a mixture. When the organic solvent is used in a mixture, the mixture ratio may be controlled in accordance with a desirable battery performance.

The carbonate based solvent may include a mixture of cyclic carbonate and chain carbonate. The cyclic carbonate and the chain carbonate may be mixed together in a volume ratio of about 1:1 to about 1:9. Maintaining the volume ratio within this range may help improve performance of the electrolyte.

The non-aqueous organic solvent may further include an aromatic hydrocarbon based organic solvent in addition to a carbonate based solvent. The carbonate-based and the aromatic hydrocarbon-based solvents may be mixed together in a volume ratio ranging from about 1:1 to about 30:1.

The aromatic hydrocarbon-based organic solvent may be an aromatic hydrocarbon-based compound represented by the following Chemical Formula A.

[Chemical Formula A]

In the above Chemical Formula A, $R^{101}$ to $R^{106}$ may each independently be hydrogen, a halogen, a C1 to C10 alkyl group, a C1 to C10 haloalkyl group, or a combination thereof.

The aromatic hydrocarbon based organic solvent may include, for example, benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The lithium salt may be dissolved in the non-aqueous solvent, may supply lithium ions in a rechargeable lithium battery, may basically operate the rechargeable lithium battery, and may improve lithium ion transfer between positive and negative electrodes. The lithium salt may include, for example, a supporting salt of $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, e.g., x and y are an integer of 1 to 20, LiCl, LiI, $LiB(C_2O_4)_2$ (lithium bis(oxalato) borate (LiBOB)), or a combination thereof. The lithium salt may be used in a concentration of about 0.1 M to about 2.0 M. Including the lithium salt at the above concentration range may help provide an electrolyte that may have excellent performance and lithium ion mobility, for example, due to optimal electrolyte conductivity and viscosity.

The additive may include an ethylene carbonate-based compound represented by the following Chemical Formula 1 and a pyridine-based compound represented by the following Chemical Formula 2.

[Chemical Formula 1]

[Chemical Formula 2]

In the above Chemical Formulae 1 and 2, $R^{11}$, $R^{12}$ and $R^1$ to $R^5$ may each independently be hydrogen, a halogen, a substituted or unsubstituted C1 to C20 alkyl group, or a C1 to C20 haloalkyl group, at least one of $R^{11}$ and $R^{12}$ is a halogen, and at least one of $R^1$ to $R^5$ is a halogen.

The halogen element may be, for example, fluorine (F), chlorine (Cl), bromine (Br), or iodine (I). In an embodiment, the halogen may be fluorine (F).

An ethylene carbonate-based compound represented by the above Chemical Formula 1 may form a stable compound such as, for example, LiF or SiF, in a solid electrolyte interface (SEI) film. A halogen element that may have a lower LUMO (the lowest unoccupied molecule orbital function) than unsubstituted ethylene carbonate may be easily reduced, and may easily form the SEI film.

When the electrolyte includes an ethylene carbonate-based compound represented by the above Chemical Formula 1, a stable SEI film may be formed, and cycle-life characteristics of a rechargeable lithium battery including the SEI film may be improved. The effect of the electrolyte according to one embodiment may be obtained regardless of the kind of negative active material used together with the electrolyte. However, the effects may be maximized when the electrolyte is used together with a silicon-based negative active material. The layer on the negative electrode may include a film having high binding energy such as, for example, Si—F or Li—F, and the stability of the layer and cycle-life characteristics may be improved.

An ethylene carbonate-based compound represented by the above Chemical Formula 1 may be included in an amount of about 0.1 parts by weight to about 20 parts by weight, for example, about 7 parts by weight to about 12 parts by weight, based on 100 parts by weight of the non-aqueous organic solvent. Maintaining the amount of ethylene carbonate-based compound represented by the above Chemical Formula 1 within such ranges may help provide improved cycle-life characteristics of a high-capacity rechargeable lithium battery.

However, when the electrolyte includes only an ethylene carbonate-based compound represented by the above Chemical Formula 1, there may be a limit to improvements in high cycle-life characteristics, for example, cycle-life characteristics at a high temperature, or storage characteristics at a high temperature.

According to one embodiment, the electrolyte may include a pyridine-based compound represented by the above Chemical Formula 2 along with an ethylene carbonate-based compound as an additive. The electrolyte may be suppressed from a side reaction with an active material, the amount of gas generated therefrom may be decreased, thickness variation of a rechargeable lithium battery may be decreased, and cycle-life characteristics of the rechargeable lithium battery may be improved. In addition, high temperature characteristics of the rechargeable lithium battery may be improved. The kind of negative active material has no particular limit, but when a silicon-based active material is applied to a negative electrode, a layer on the negative electrode may include a component having high binding energy such as, for example, Si—F or Li—F, the component may improve stability of the layer, and cycle-life characteristics of a battery may be improved.

In the above Chemical Formula 2, at least one of $R^1$ to $R^5$ may be a C1 to C20 alkyl group. For example, at least one of $R^1$ to $R^5$ may be a C1 to C10 alkyl group, for example, a methyl group, an ethyl group, a propyl group, an isopropyl group, a butyl group, an isobutyl group, a t-butyl group, a pentyl group, a hexyl group, an ethenyl group, a propenyl group, a butenyl group, a cyclopropyl group, a cyclobutyl group, a cyclopentyl group, or a cyclohexyl group.

In the above Chemical Formula 2, when at least one of $R^1$ to $R^5$ is a halogen element, and at least one of $R^1$ to $R^5$ is a C1 to C20 alkyl group, the substituted halogen element and the alkyl group may have various positions, e.g., a position of ortho, meta, para, etc., relative to each other.

When at least one of $R^1$ to $R^5$ in the above Chemical Formula 2 is a halogen element, and at least one of $R^1$ to $R^5$ is a C1 to C20 alkyl group, thickness variation ratio of a battery may be decreased, cycle-life characteristics of the battery may be improved, thermal stability may be increased, and high temperature cycle-life characteristics may be improved.

A pyridine-based compound represented by the above Chemical Formula 2 may be included in an amount of about 0.1 parts by weight to about 3 parts by weight, for example, about 0.1 parts by weight to about 2 parts by weight, about 0.1 to about 1 part by weight, about 0.5 parts by weight to about 3 parts by weight, or about 0.5 parts by weight to about 2 parts by weight, based on 100 parts by weight of the non-aqueous organic solvent. Maintaining the amount of pyridine-based compound represented by the above Chemical Formula 2 within such ranges may help provide smaller thickness variations of a high-capacity rechargeable lithium battery and improved cycle-life characteristics.

The ethylene carbonate-based compound and the pyridine-based compound may be mixed in an appropriate ratio, for example, in a weight ratio of about 5:1 to about 20:1. Maintaining the ratio of the ethylene carbonate-based compound to the pyridine-based compound within such a range may help provide improved cycle-life characteristics and high temperature characteristics.

Negative Electrode

The negative electrode 112 may include a current collector and a negative active material layer formed on the current collector, and the negative active material layer may include a negative active material.

The negative active material may include a silicon-based material. The silicon-based material may be Si, $SiO_x$, a Si—C composite, a Si-Q alloy, or a combination thereof; x may be in the range: $0<x<2$, and Q may be an alkali metal, an alkaline-earth metal, a Group 13 to 16 element, a transition metal, a rare earth element, or a combination thereof, provided that Q is not Si.

Specific examples of Q include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

A negative active material including the silicon-based material may have a theoretical capacity of about 4400 mAh/g and may be used to form a rechargeable lithium battery having high-capacity.

The negative active material layer may further include a binder, and optionally a conductive material.

The binder may improve binding properties of negative active material particles with one another and with a current collector. The binder may include a non-water-soluble binder, a water-soluble binder, or a combination thereof.

Examples of the non-water-soluble binder include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, and combinations thereof.

The water-soluble binder includes a styrene-butadiene rubber, an acrylated styrene-butadiene rubber, polyvinyl alcohol, sodium polyacrylate, a copolymer including propylene and a C2 to C8 olefin, a copolymer of (meth)acrylic acid and (meth)acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkaline metal salts thereof. The alkaline metal may be sodium (Na), potassium (K), or lithium (Li). The cellulose-based compound may be included in an amount of 0.1 parts by weight to 3 parts by weight based on 100 parts by weight of the negative active material.

The conductive material may improve electrical conductivity of an electrode. Any electrically conductive material may be used as a conductive material, unless it causes a chemical change. Examples thereof include a carbon-based material such as, for example, natural graphite, artificial graphite, carbon black, acetylene black, ketjen black, or a carbon fiber; a metal-based material such as, for example, a metal powder or a metal fiber, of, for example, copper, nickel, aluminum, or silver; a conductive polymer such as, for example, a polyphenylene derivative; or a mixture thereof.

The current collector may be a copper foil, a nickel foil, a stainless steel foil, a titanium foil, a nickel foam, a copper foam, a polymer substrate coated with a conductive metal, or a combination thereof.

Positive Electrode

The positive electrode 114 may include a current collector and a positive active material layer formed on the current collector.

The current collector may use, for example, Al.

The positive active material layer may include a positive active material, a binder, and optionally a conductive material.

The positive active material may be a compound (lithiated intercalation compound) capable of intercalating and deintercalating lithium. For example, at least one lithium metal composite oxide of lithium and a metal of cobalt, manganese, nickel, or a combination thereof may be used, and specific examples thereof may be a compound represented by one of the following chemical formulae: $Li_aA_{1-b}R_bD_2$ ($0.90 \leq a \leq 1.8$ and $0 \leq b \leq 0.5$); $Li_aE_{1-b}R_bO_{2-c}D_c$ ($0.90 \leq a \leq 1.8$, $0 \leq b \leq 0.5$ and $0 \leq c \leq 0.05$); $Li_aE_{2-b}R_bO_{4-c}D_c$ ($0.90 \leq a \leq 1.8$, $0 \leq b \leq 0.5$, $0 \leq c \leq 0.05$); $Li_aNi_{1-b-c}Co_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cD^\alpha$ ($0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_bE_cG_dO_2$ ($0.90 \leq a \leq 1.8$, $0 \leq b \leq 0.9$, $0 \leq c \leq 0.5$ and $0.001 \leq d \leq 0.1$); $Li_aNi_{b-}Co_cMn_dGeO_2$ ($0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$ and $0.001 \leq b \leq 0.1$); $Li_aMnG_bO_2$ ($0.90 \leq a \leq 1.8$ and $0.001 \leq b \leq 0.1$); $Li_aMn_2G_bO_4$ ($0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The positive active material may include the positive active material with the coating layer, or a compound of the active material and the active material coated with the coating layer. The coating layer may include a coating element compound such as an oxide of a coating element, hydroxide of a coating element, oxyhydroxide of a coating element, oxycarbonate of a coating element, or hydroxycarbonate of a coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating process may include any coating processes that does not cause side effects on the properties of the positive active material (e.g., spray coating, dipping), and may be determined by one of skill in the art.

The binder may improve binding properties of positive active material particles with one another and with a current collector. Examples thereof include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, and nylon.

The conductive material may improve conductivity of an electrode. Any electrically conductive material may be used as a conductive material, unless it causes a chemical change. Examples thereof include one or more of natural graphite, artificial graphite, carbon black, acetylene black, ketjen black, a carbon fiber, a metal powder or a metal fiber, for example, of copper, nickel, aluminum, or silver, and a polyphenylene derivative.

The negative electrode 112 and the positive electrode 114 may be manufactured by a method including mixing an active material, a conductive material, and a binder into an active material composition and coating the composition on a current collector. The electrode manufacturing method may be a general electrode manufacturing method. The solvent may be, for example, N-methylpyrrolidone.

Separator

The rechargeable lithium battery according to one embodiment may include a separator 113. The separator may include any materials commonly used in a general lithium battery to separate a negative electrode from a positive electrode and provide a transporting passage of lithium ion. The separator may have a low resistance to ion transport and an excellent impregnation for electrolyte. For example, the separator may be selected from glass fiber, polyester, TEFLON (tetrafluoroethylene), polyethylene, polypropylene, polytetrafluoroethylene (PTFE), or a combination thereof. The separator may have a form of a non-woven fabric or a woven fabric. For example, for a lithium ion battery, polyolefin-based polymer separator such as, for example, polyethylene or polypropylene, may be used. In order to provide increased heat resistance or mechanical strength, a coated separator including a ceramic component or a polymer material may be used. Selectively, it may have a monolayered or multi-layered structure.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLE 1

For a negative active material, a mixture of MAG-V4 graphite made by Hitachi Chemical Materials Co. Ltd. and a silicon-based active material ($SiO_x$, wherein x is 1.1) made by OTC Inc. was used. 97.5 wt % of the negative active material, 1.5 wt % of a styrene-butadiene rubber (SBR) binder and 1 wt % of a carboxymethyl cellulose (CMC) thickener were mixed, the mixture was dispersed in the water to prepare a negative active material layer composition, and the negative active material layer composition was coated on a copper foil and then, dried and compressed, manufacturing a negative electrode.

For a positive active material, lithium cobalt oxide ($LiCoO_2$) was used to manufacture a positive electrode, and then, a rechargeable lithium battery cell was manufactured by putting the positive and negative electrodes and a polypropylene CCS separator (G0314A) in a battery case and injecting an electrolyte solution thereinto. The electrolyte solution was prepared by mixing ethylenecarbonate (EC): methylethylcarbonate (EMC):diethylcarbonate (DEC) in a volume ratio of 30:50:20 and dissolving $LiPF_6$ in a concentration of 1.1 M therein, and adding an electrolyte solution additive.

As the electrolyte solution additive, 10 parts by weight of fluoroethylenecarbonate (FEC) and 2 parts by weight of 2-fluoro-4-methylpyridine (FMP) were used based on 100 parts by weight of the electrolyte solution.

EXAMPLE 2

A rechargeable lithium battery cell was manufactured according to the same method as Example 1 except for using 10 parts by weight of the fluoroethylenecarbonate (FEC) and 1 part by weight of the 2-fluoro-4-methylpyridine (FMP) as the electrolyte solution additive.

EXAMPLE 3

A rechargeable lithium battery cell was manufactured according to the same method as Example 1 except for using 10 parts by weight of the fluoroethylenecarbonate (FEC) and 0.5 parts by weight of the 2-fluoro-4-methylpyridine (FMP) as the electrolyte solution additive.

EXAMPLE 4

A rechargeable lithium battery cell was manufactured according to the same method as Example 1 except for using 1 part by weight of 3-fluoropyridine (FP) instead of the 2-fluoro-4-methylpyridine (FMP) as the electrolyte solution additive.

COMPARATIVE EXAMPLE 1

A rechargeable lithium battery cell was manufactured according to the same method as Example 1 except for using only 10 parts by weight of the fluoroethylenecarbonate (FEC) but no 2-fluoro-4-methylpyridine (FMP) as the electrolyte solution additive.

COMPARATIVE EXAMPLE 2

A rechargeable lithium battery cell was manufactured according to the same method as Example 1 except for using only 2 parts by weight of the 2-fluoro-4-methylpyridine (FMP) but no fluoroethylenecarbonate (FEC) as the electrolyte solution additive.

The composition and content of the negative active materials and the electrolyte solution additives in Examples 1 to 4 and Comparative Examples 1 and 2 are provided in the following Table 1.

TABLE 1

|  |  | Example | | | | Comparative Example | |
|---|---|---|---|---|---|---|---|
|  |  | 1 | 2 | 3 | 4 | 1 | 2 |
| Negative active material | Graphite | 97 | 97 | 97 | 97 | 97 | 97 |
|  | $SiO_x$ | 3 | 3 | 3 | 3 | 3 | 3 |
| Electrolyte solution additive | FEC | 10 | 10 | 10 | 10 | 10 | — |
|  | FMP | 2 | 1 | 0.5 | — | — | 2 |
|  | FP | — | — | — | 1 | — | — |

In Table 1, the amount of graphite and $SiO_x$ is wt % based on the total amount of graphite and $SiO_x$. In Table 1, the electrolyte solution additive contents in the Table 1 are each based on a unit of parts by weight.

EXPERIMENTAL EXAMPLE 1: Cycle-Life Characteristics

Figure 2:
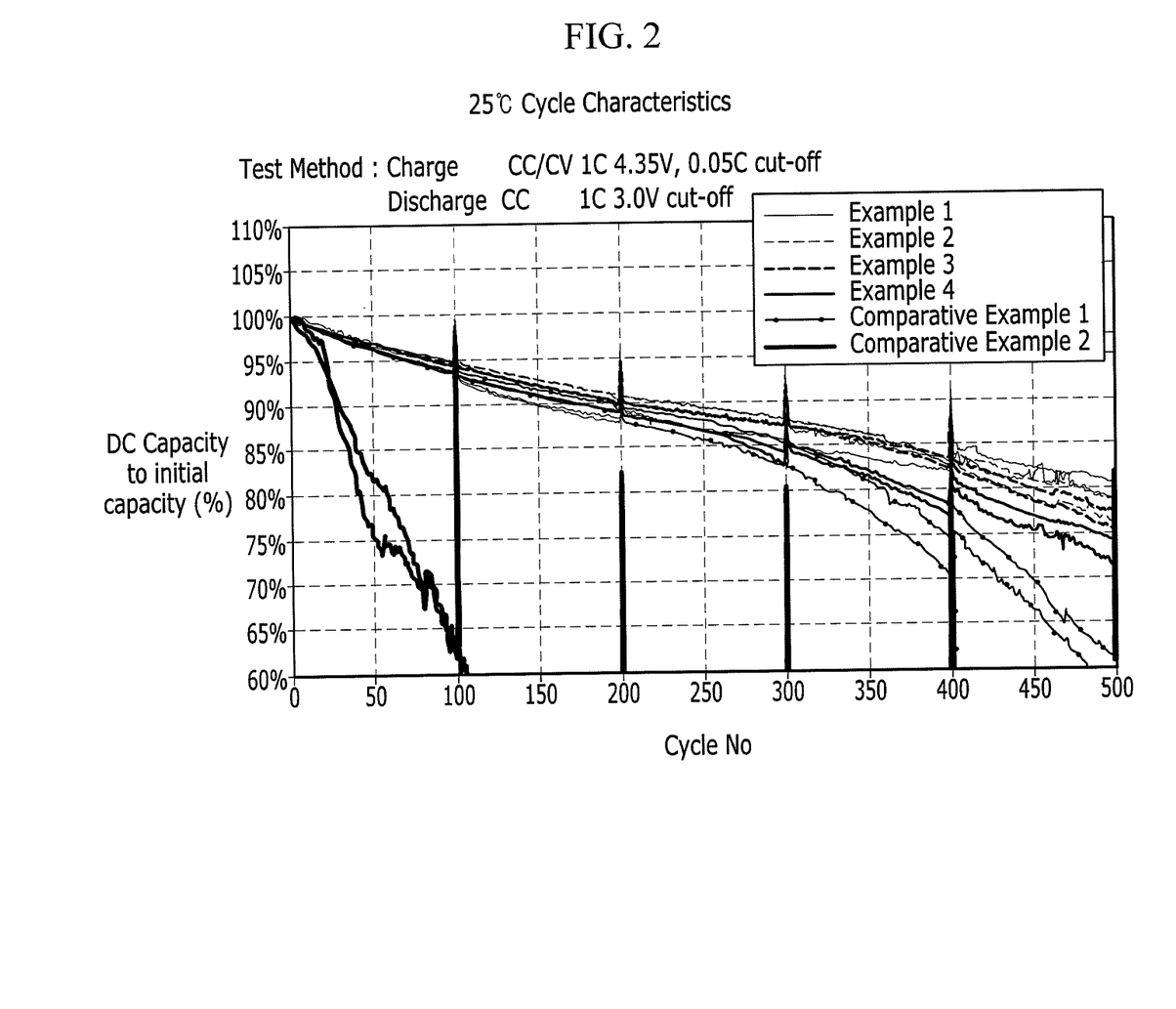
FIG. 2 illustrates a graph showing capacity change of rechargeable lithium batteries according to Examples 1 to 4 and Comparative Examples 1 and 2 depending on a cycle.

Capacity change of the rechargeable lithium battery cells according to Examples 1 to 4 and Comparative Examples 1 and 2 for 500 cycles under the following charge and discharge conditions, was measured, and the results are provided in FIG. 2.

Charge Condition: CC/CV 1 C 4.35 V, 0.05 C cut-off
Discharge Condition: CC 1 C 3.0 V cut-off Referring to FIG. 2, the rechargeable lithium battery cell of Comparative Example 2 showed sharply deteriorated capacity as soon as a cycle started, while the rechargeable lithium battery cell of Comparative Example 1 showed sharply deteriorated capacity after 300 cycles. On the other hand, the rechargeable lithium battery cells of Examples 1 to 4 realized excellent capacity even after 300 cycles compared with the rechargeable lithium battery cells of Comparative Examples 1 and 2.

EXPERIMENTAL EXAMPLE 2: Battery Thickness Variation

Figure 3:
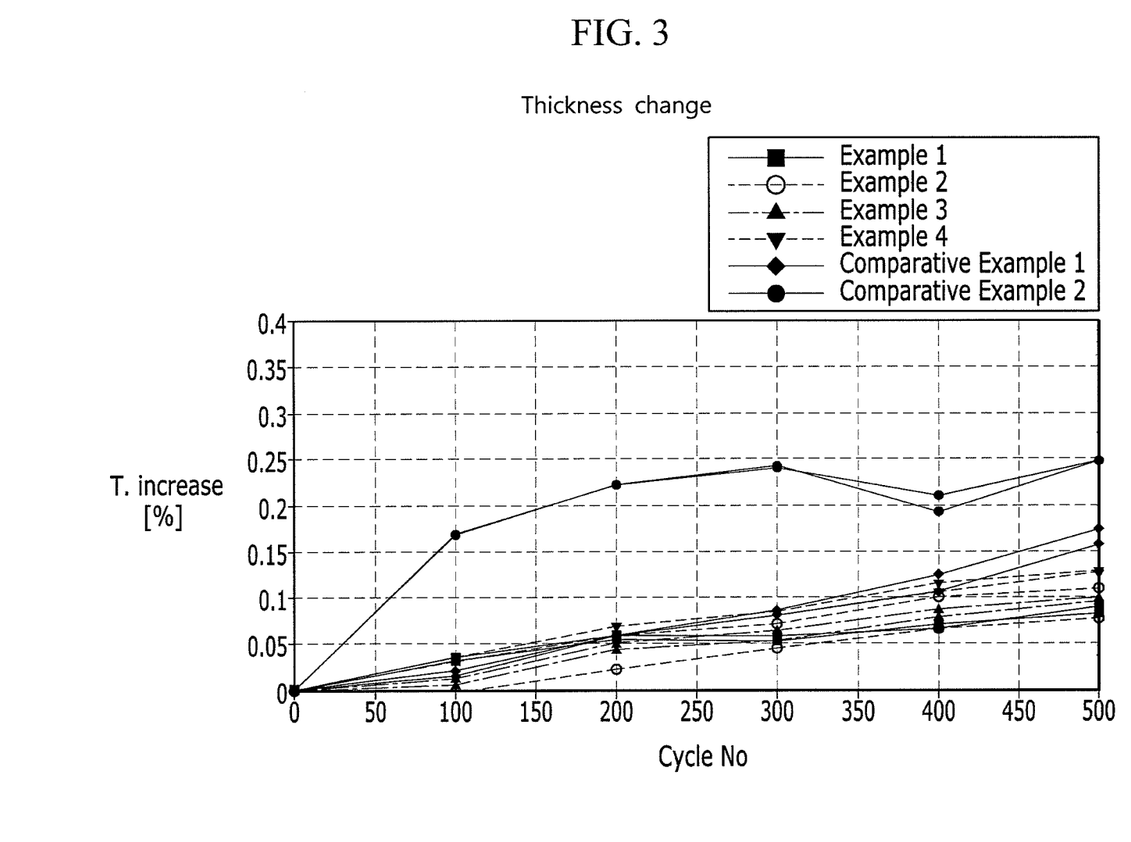
FIG. 3 illustrates a graph showing thickness variation ratio of the rechargeable lithium batteries according to Examples 1 to 4 and Comparative Examples 1 and 2 depending on a cycle.

Thickness variation ratio of the rechargeable lithium battery cells according to Examples 1 to 4 and Comparative Examples 1 and 2 was measured as 500 cycles under the following charge and discharge conditions proceeded, and the results are provided in FIG. 3.

Charge Condition: CC/CV 1 C 4.35 V, 0.05 C cut-off
Discharge Condition: CC 1 C 3.0 V cut-off Referring to FIG. 3, the rechargeable lithium battery cells of Examples 1 to 4 showed a lower thickness variation ratio than the rechargeable lithium battery cells of Comparative Examples 1 and 2 until 500 cycles proceeded.

EXPERIMENTAL EXAMPLE 3: AC Impedance

Figure 4:
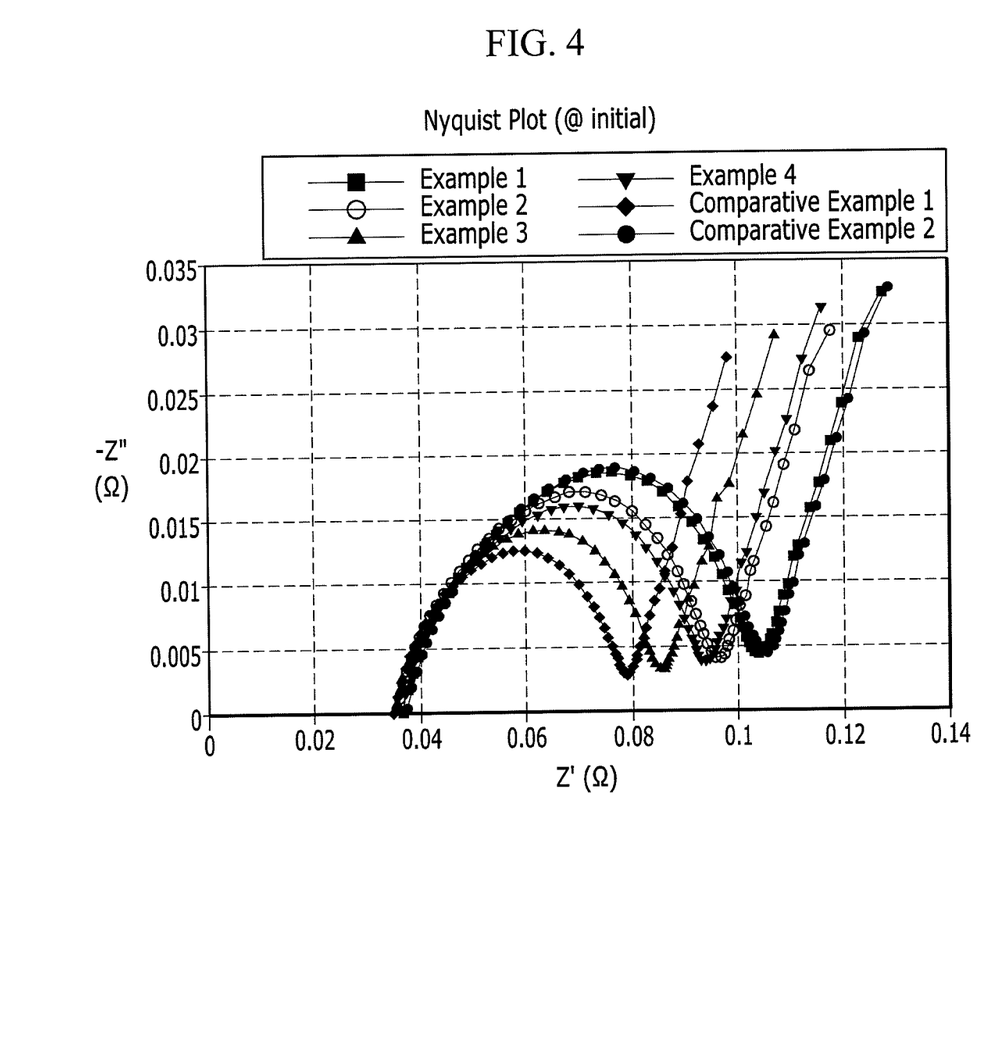
FIG. 4 illustrates a graph showing AC impedance of the rechargeable lithium batteries according to Examples 1 to 4 and Comparative Examples 1 and 2 before a cycle proceeds.
Figure 5:
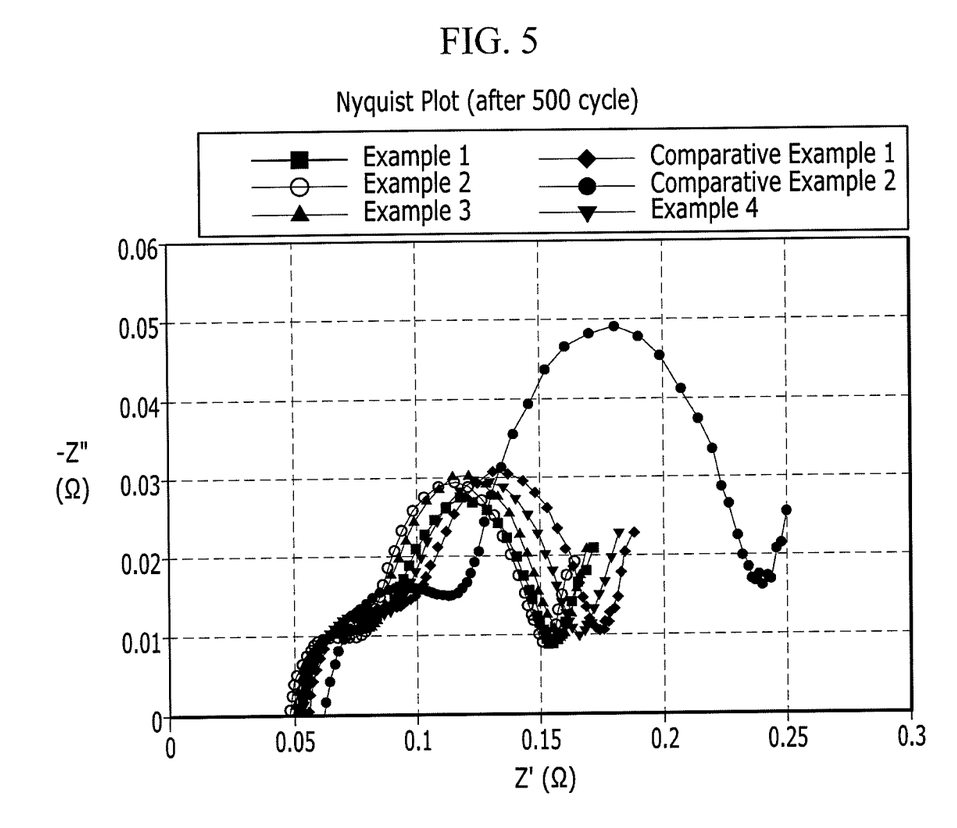
FIG. 5 illustrates a graph showing AC impedance of the rechargeable lithium batteries according to Examples 1 to 4 and Comparative Examples 1 and 2 after 500 cycles.

AC impedance of the rechargeable lithium battery cells of Examples 1 to 4 and Comparative Examples 1 and 2 before the cycles was measured and provided in FIG. 4, and AC impedance thereof after the cycles was measured and provided in FIG. 5.

The AC impedance before the cycles in FIG. 4 was measured under a full-charge condition of 0.7 C and 4.35 V for 3 hours' cut-off after the formation, and the AC impedance after the cycles in FIG. 5 was measured under the cut-off/full-charge condition of 0.7 C, 4.35 V and 3 hours after the cell was charge and discharged for 500 cycles under the same condition with the cycle-life characteristics and then.

Referring to a Nyquist plot before the cycles in FIG. 4, the rechargeable lithium battery cell including only 10 parts by weight of FEC according to Comparative Example 1 showed low initial interface resistance, but the rechargeable lithium battery cell including an additive such as FMP or FP showed increased interface resistance. In addition, as the FMP was more included, the interface resistance increased. The data indirectly shows that a fluoro pyridine-based additive such as the FMP or the FP well formed a layer on the negative electrode.

On the other hand, as shown in FIG. 5, the rechargeable lithium battery cell according to Comparative Examples 1 and 2 including 10 parts by weight of FEC and 2 parts by weight of FMP, respectively showed deteriorated cycle-life characteristics after the cycles but largely increased interface resistance, while the rechargeable lithium battery cells of Examples 1 to 4 showed excellent cycle-life characteristics but relatively small interface resistance increase.

From the AC impedance measurement, the rechargeable lithium battery cells of Examples 1 to 4 after the cycles showed less degradation of an active material, and the measurements indirectly proved advantageous cycle-life tendency of the active material.

EXPERIMENTAL EXAMPLE 4: Cyclic Voltammetry

TABLE 2

|  |  | Example | | | | | | Comparative Example | | |
|---|---|---|---|---|---|---|---|---|---|---|
|  |  | A | B | C | D | E | F | A | B | C |
| negative active material | graphite | 100 | 100 | 97 | 97 |  |  | 100 | 97 |  |
|  | $SiO_x$ |  |  | 3 | 3 |  |  |  | 3 |  |
|  | SCN |  |  |  |  | 100 | 100 |  |  | 100 |
| electrolyte solution additive | FEC | 2 | — | 2 | — | 2 | — | — | — | — |
|  | FMP | — | 2 | — | 2 | — | 2 | — | — | — |

In Table 2, SCN refers to silicon carbon nanocomposite.

Figure 6:
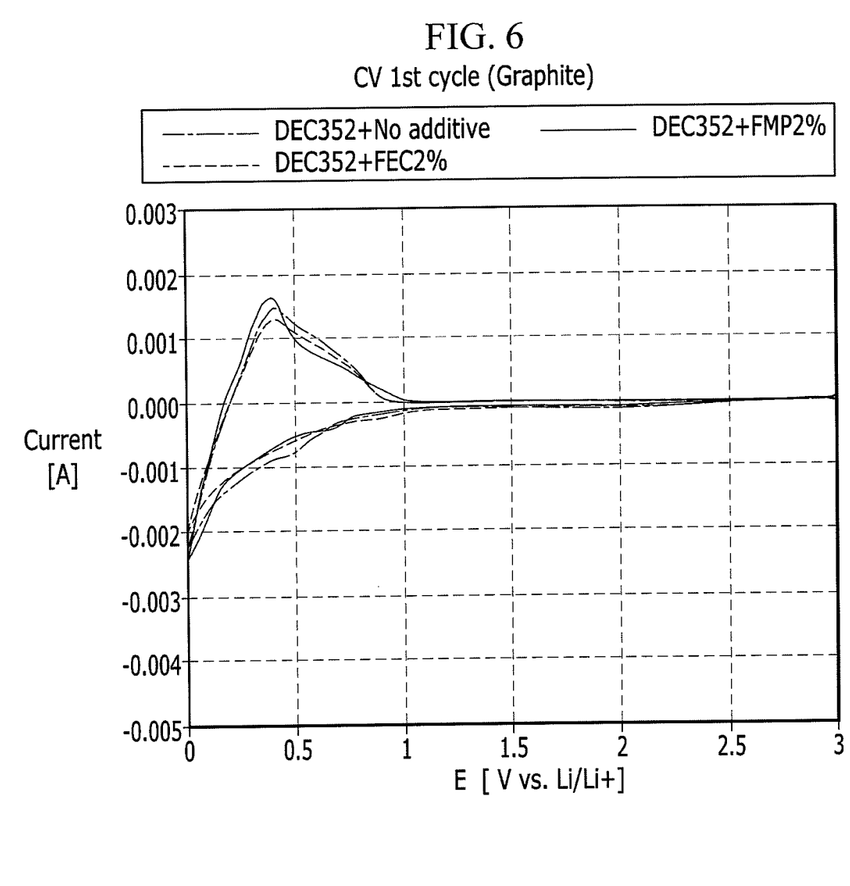
FIGS. 6 to 8 illustrate graphs showing cyclic voltammetry of each rechargeable lithium battery according to Examples A to F and Comparative Examples A to C.
Figure 7:
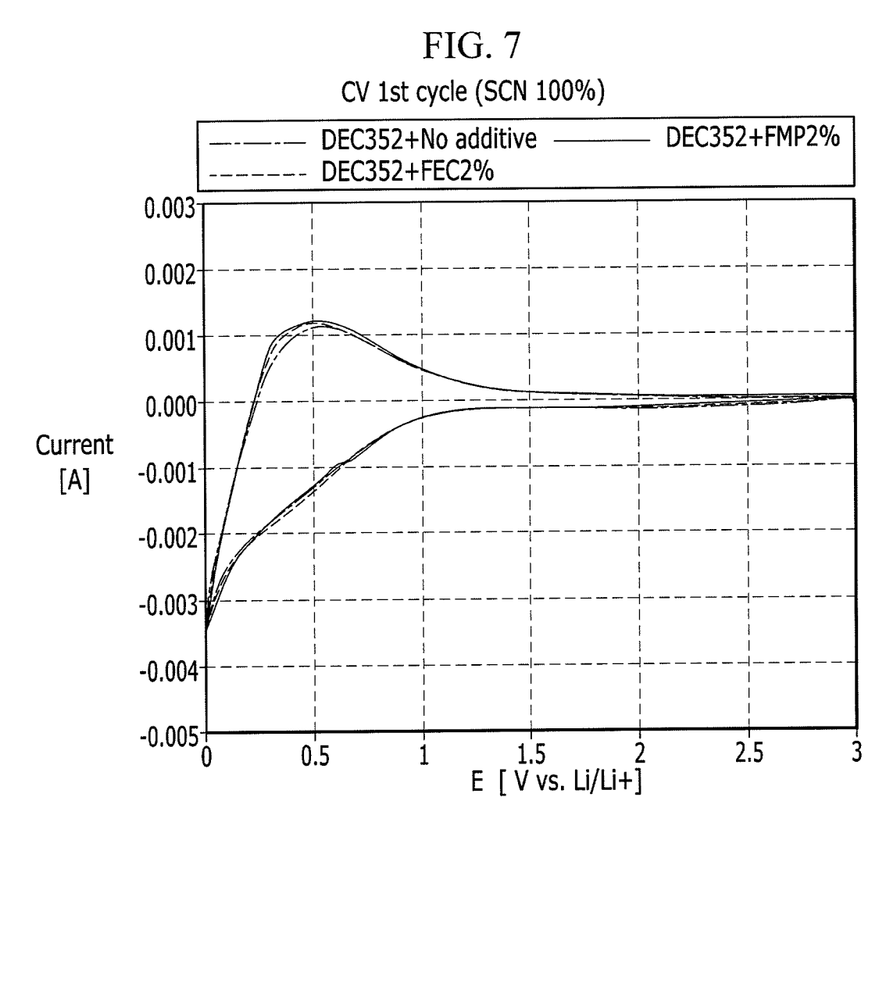
Figure 8:
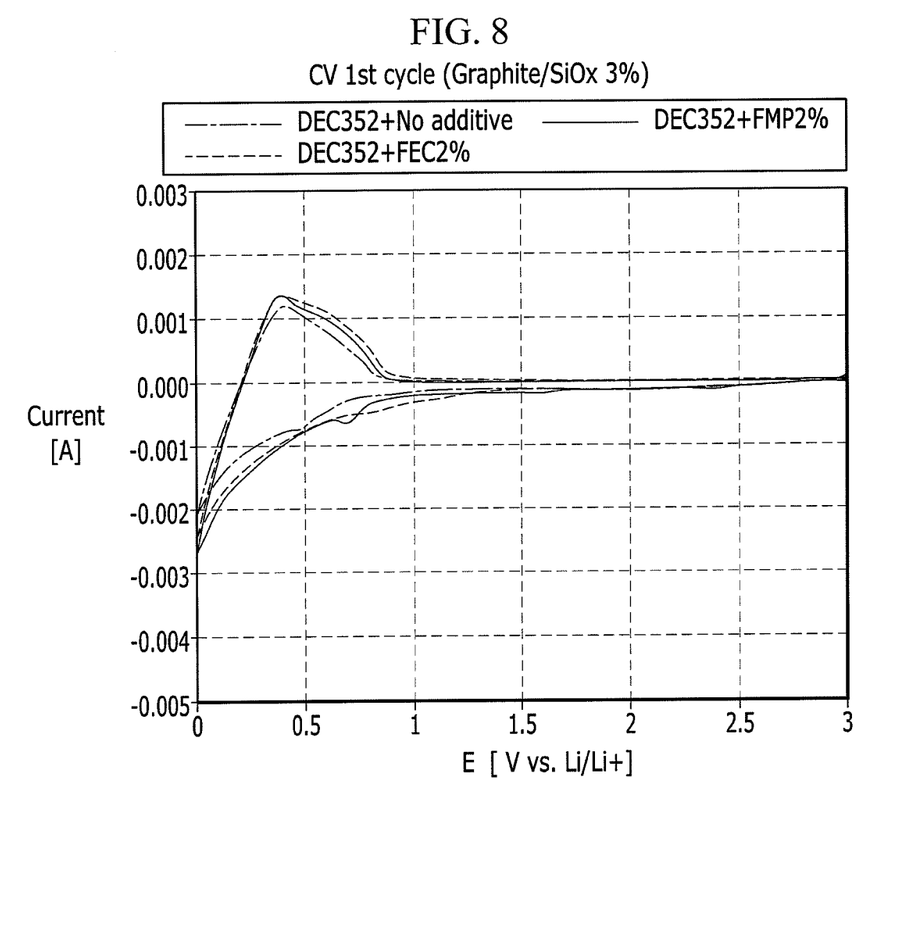

Cyclic voltammetry of the rechargeable lithium battery cells manufactured by varying a negative active material in Table 2 according to Examples A to F and Comparative Examples A to C was measured, and the results are provided in FIGS. 6 to 8.

Three kinds of negative electrode were used as a working electrode. FIG. 6 shows cyclic voltammetry of a rechargeable lithium battery cell using only graphite (MAG-V4) as a negative active material, FIG. 7 illustrates cyclic voltammetry of a rechargeable lithium battery cell using only SCN (Hitachi Chemical Materials Co., Ltd.) as a negative active material, and FIG. 8 illustrates cyclic voltammetry of a rechargeable lithium battery cell using a blend of graphite and $SiO_x$ as a negative active material. For a reference electrode and a counter electrode, a lithium metal electrode was used. FIG. 6 illustrates a graph showing the results of Examples A and B and Comparative Example A, FIG. 7 illustrates a graph showing the results of Examples E and F and Comparative Example C, and FIG. 8 illustrates a graph showing the results of Examples C and D and Comparative Example B.

The cyclic voltammetry (CV) was measured under the following conditions:
scan range: 3-7 V; and
scan rate: 0.1 mV/sec.

The CV measurement was used to indirectly examine reduction reactivity of an electrolyte solution additive depending on the kind of negative active material, i.e., if a layer was formed or not.

As shown in FIGS. 6 and 8, the cells using graphite as a main active material such as 100% graphite or a mixture of graphite and $SiO_x$ in a weight ratio of 97:3 showed an ethylenecarbonate reduction peak around 0.5 V when no additive was used and a reduction peak around 0.8 V to 0.9 V when 2 parts by weight of FEC was added thereto. In addition, a reduction peak was found around 0.7 V when FMP was added thereto.

On the other hand, when only silicon (Si) was included in a negative active material, for example, 100% of SCN, a peak of an ethylene carbonate or fluoroethylenecarbonate film was not found as shown in FIG. 7, and a reduction peak was found around 0.7 V when FMP was added to the negative active material.

When the FMP additive was used, it was experimentally proven that a reduction decomposition layer in a Si-based active material as well as the layer in a graphite or graphite-based active material was well formed.

This indirectly showed that the FMP was more proper for forming a layer in the Si-based active material than other additives.

By way of summation and review, for positive active materials of a rechargeable lithium battery, lithium-transition element composite oxides being capable of intercalating lithium such as, for example, $LiCoO_2$, $LiMn_2O_4$, $LiNiO_2$, and $LiNi_{1-x}Co_xO_2$ (0<x<1), have been researched.

For negative active materials, various carbon-based materials such as artificial graphite, natural graphite, and hard carbon have been used. Recently, demand of a battery having high energy density increasingly has required a negative active material having high theoretical capacity density. Accordingly, Si, Sn, and Ge alloyed with lithium and an oxide thereof and an alloy thereof have drawn attention. A silicon-based negative active material may have very high charge capacity and may be widely applied to a high-capacity battery.

Silicon-based negative active materials may have unfavorable cycle-life characteristics, and may be limited in terms of commercial availability. For example, the structure of the silicon-based negative active material may be changed and destroyed by volume expansion of greater than or equal to about 300%, and the silicon-based negative active material may have an issue of losing a moving path. Further, the silicon-based negative active material may have an issue of losing capacity, since its component such as, for example, silicon oxide (—Si—O—Si—) or silanol (SiOH), may take part in a reduction reaction with an electrolyte solution. The reduction reaction of the electrolyte solution may form a solid electrolyte interphase (SEI) film during the initial charge and discharge cycle. Additionally, the SEI film may be continuously formed as cycles further proceed, since the structure of the silicon-based negative active material may be destroyed and its new interphase may be exposed to the electrolyte solution.

Accordingly, research on improvements, for example, of cycle-life characteristics and stability, of a rechargeable lithium battery manufactured by applying the silicon-based negative active material are underway.

One embodiment may provide a rechargeable lithium battery having high-capacity and small thickness variations and improved cycle-life characteristics.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable lithium battery, comprising:
a positive electrode;
a negative electrode including a negative active material, the negative active material including a silicon-based material; and
an electrolyte solution including a lithium salt, a non-aqueous organic solvent, and an additive, the additive including an ethylene carbonate-based compound represented by Chemical Formula 1 and a pyridine-based compound represented by Chemical Formula 2:

[Chemical Formula 1]

[Chemical Formula 2]

wherein:
the ethylene carbonate-based compound represented by Chemical Formula 1 is included in an amount of about 0.1 parts by weight to about 20 parts by weight based on 100 parts by weight of the non-aqueous organic solvent,
the pyridine-based compound represented by Chemical Formula 2 is included in an amount of about 0.1 parts by weight to about 3 parts by weight based on 100 parts by weight of the non-aqueous organic solvent
$R^{11}$, $R^{12}$, and $R^1$ to $R^5$ are each independently hydrogen, a halogen, a substituted or unsubstituted C1 to C20 alkyl group, or a C1 to C20 haloalkyl group, provided that:
at least one of $R^{11}$ and $R^{12}$ is a halogen, and
at least one of $R^1$ to $R^5$ is a halogen.

2. The rechargeable lithium battery as claimed in claim 1, wherein at least one of $R^1$ to $R^5$ is a C1 to C20 alkyl group.

3. The rechargeable lithium battery as claimed in claim 1, wherein the pyridine-based compound represented by Chemical Formula 2 is included in an amount of about 0.1 parts by weight to about 1 part by weight based on 100 parts by weight of the non-aqueous organic solvent.

4. The rechargeable lithium battery as claimed in claim 1, wherein the ethylene carbonate-based compound represented by Chemical Formula 1 is included in an amount of about 7 parts by weight to about 12 parts by weight based on 100 parts by weight of the non-aqueous organic solvent.

5. The rechargeable lithium battery as claimed in claim 1, wherein the ethylene carbonate-based compound represented by Chemical Formula 1 and the pyridine-based compound represented by Chemical Formula 2 are included in a weight ratio of about 5:1 to about 20:1.

6. The rechargeable lithium battery as claimed in claim 1, wherein the silicon-based material includes Si, $SiO_x$, a Si—C composite, a Si-Q alloy, or a combination thereof, wherein:
0<x<2, and
Q is an alkali metal, an alkaline-earth metal, a Group 13 to 16 element, a transition metal, a rare earth element, or a combination thereof, provided that Q is not Si.

7. The rechargeable lithium battery as claimed in claim 1, wherein the non-aqueous organic solvent includes ethylene carbonate.

8. The rechargeable lithium battery as claimed in claim 1, wherein at least one of $R^{11}$, $R^{12}$, and $R^1$ to $R^5$ is a substituted C1 to C20 alkyl group substituted with C1 to C30 alkyl group; a C2 to C30 alkenyl group, a C2 to C30 alkynyl group, a C1 to C10 alkylsilyl group; a C3 to C30 cycloalkyl group; a C6 to C30 aryl group; a C1 to C30 heteroaryl group; a C1 to C10 alkoxy group; a silane group; an alkylsilane group; an alkoxysilane group; an amine group; an alkylamine group; an arylamine group; or a halogen.

9. The rechargeable lithium battery as claimed in claim 1, wherein:
at least one of $R^{11}$, $R^{12}$ is fluorine, bromine, chlorine or iodine, and
at least one of $R^1$ to $R^5$ is fluorine, bromine, chlorine or iodine.

10. The rechargeable lithium battery as claimed in claim 1, wherein at least one of $R^1$ to $R^5$ is a methyl group, an ethyl group, a propyl group, an isopropyl group, a butyl group, an isobutyl group, a t-butyl group, a pentyl group, a hexyl group, an ethenyl group, a propenyl group, a butenyl group, a cyclopropyl group, a cyclobutyl group, a cyclopentyl group, or a cyclohexyl group.

* * * * *